(12) United States Patent
Schofield

(10) Patent No.: US 10,372,682 B2
(45) Date of Patent: Aug. 6, 2019

(54) MAINTAINING DATA INTEGRITY

(75) Inventor: Andrew John Schofield, Hursley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 987 days.

(21) Appl. No.: 12/700,861

(22) Filed: Feb. 5, 2010

(65) Prior Publication Data
US 2010/0205164 A1  Aug. 12, 2010

(30) Foreign Application Priority Data

Feb. 6, 2009 (EP) .................................... 09152290

(51) Int. Cl.
G06F 17/00 (2019.01)
G06F 7/00 (2006.01)
G06F 16/176 (2019.01)

(52) U.S. Cl.
CPC ................ G06F 16/1774 (2019.01)

(58) Field of Classification Search
CPC .............................................. G06F 17/30171
USPC ................................................... 707/704
See application file for complete search history.

(56) References Cited

U.S. PATENT DOCUMENTS

| | | | | |
|---|---|---|---|---|
| 4,819,159 A * | 4/1989 | Shipley | ................. | G06F 11/203 714/19 |
| 5,115,499 A * | 5/1992 | Stiffler | ..................... | G06F 9/52 711/148 |
| 5,319,780 A * | 6/1994 | Catino et al. | .......... | 707/999.008 |
| 5,355,477 A * | 10/1994 | Strickland | ............... | G06F 9/526 707/690 |
| 5,414,839 A * | 5/1995 | Joshi | ..................... | 707/999.008 |
| 5,566,319 A * | 10/1996 | Lenz | ............................ | 711/147 |
| 5,692,178 A | 11/1997 | Shaughnessy | | |
| 5,895,494 A * | 4/1999 | Scalzi | ................. | G06F 11/2289 711/150 |
| 6,026,401 A * | 2/2000 | Brealey | .................... | G06F 9/52 707/999.008 |
| 6,178,421 B1 * | 1/2001 | Dahlen et al. | ................ | 707/692 |
| 6,240,414 B1 | 5/2001 | Beizer et al. | | |
| 6,253,225 B1 * | 6/2001 | Nakahara | .............. | G06F 9/4812 718/100 |

(Continued)

FOREIGN PATENT DOCUMENTS

JP   H01207833 A   8/1989
JP   H11161535 A   6/1999

(Continued)

*Primary Examiner* — Pavan Mamillapalli
(74) *Attorney, Agent, or Firm* — Cuenot, Forsythe & Kim, LLC

(57) ABSTRACT

Data integrity is maintained in an environment in which multiple instances of a software component each can include multiple processes capable of accessing a shared resource. Each instance of the software component can be either an "active" instance (which is allowed to update data) or a "standby" instance (which is not allowed to update data). At any point in time, the environment does not comprise more than one active instance. There can, however, be more than one standby instance. Preferably, a single standby instance can become a new active instance in the event of a complete failure of the active instance, i.e. a failure associated with every process of the current active instance.

18 Claims, 6 Drawing Sheets

(56) References Cited

U.S. PATENT DOCUMENTS

| | | | | |
|---|---|---|---|---|
| 6,625,602 | B1* | 9/2003 | Meredith | G06Q 10/10 707/703 |
| 6,687,709 | B2* | 2/2004 | Williams | G06F 16/2343 707/704 |
| 6,944,133 | B2* | 9/2005 | Wisner | H04L 41/0681 370/242 |
| 7,120,631 | B1 | 10/2006 | Vahalia et al. | |
| 7,409,525 | B1* | 8/2008 | Clark | G06F 12/1072 711/206 |
| 7,814,488 | B1* | 10/2010 | Dice | G06F 9/526 707/704 |
| 7,844,585 | B2* | 11/2010 | Walker | G06F 9/466 707/704 |
| 7,904,804 | B1* | 3/2011 | Wilson | H04L 65/403 715/234 |
| 2005/0022047 | A1* | 1/2005 | Chandrasekaran | G06F 17/30362 714/5.11 |
| 2005/0080963 | A1* | 4/2005 | Schopp | G06F 9/526 710/200 |
| 2006/0259949 | A1* | 11/2006 | Schaefer | H04L 63/0428 726/1 |
| 2007/0185872 | A1 | 8/2007 | Ho et al. | |
| 2009/0307707 | A1* | 12/2009 | Gellerich | G06F 9/526 718/107 |
| 2010/0161571 | A1* | 6/2010 | Schwarzmann | G06F 16/2343 707/704 |
| 2011/0106778 | A1* | 5/2011 | Chan | G06F 16/2343 707/704 |

FOREIGN PATENT DOCUMENTS

| | | |
|---|---|---|
| JP | 2002123412 A | 4/2002 |
| JP | 2009525536 A | 7/2009 |

* cited by examiner

MAINTAINING DATA INTEGRITY

BACKGROUND

Field of the Invention

The present invention relates to an apparatus and method for maintaining data integrity.

Description of the Related Art

In a "highly available" commercial computing environment, hardware and software technologies are typically combined to provide quick recovery of critical programs from hardware and software failures. The environment is designed to eliminate single points of failure.

For example, a typical highly available environment may comprise a number of loosely coupled computers sharing resources such as disk drives. Critical programs are capable of running on any of a set of computers. Furthermore, hardware resources (e.g. disk drives) are shared amongst the computers. A hardware or software failure which leads to unavailability of a critical program can be remedied by moving the critical program to another computer thereby restoring its availability.

Typical highly available environments were historically managed by software known as high availability (HA) software. HA software typically provides management of the hardware and software components by monitoring the components and taking responsibility for moving resources in response to failures.

An example of such a highly available environment (100) is shown in FIG. 1A and comprises a first computer (105) having first HA software (117) and a first instance of a highly available software component (110) wherein the software component (110) is operable to access a shared resource e.g. a shared disk (120) comprising data).

The highly available environment (100) also comprises a second computer (115) having second HA software (119) which is operable to communicate with the first HA software (117).

In an example, the first instance (110) of the first computer (105) accesses the shared disk (120). The first HA software (117) has "ownership" of the shared disk (120).

In the event of a failure of the first computer (105), the second HA software (119) is operable to detect the failure (e.g. in response to the second HA software (119) no longer being able to communicate with the first HA software (117)).

With reference to FIG. 1B, in response, the second HA software (119) is operable to terminate the first instance (110), move ownership of the shared disk (120) to itself and subsequently start a second instance of the software component (125) on the second computer (115). The second computer (115) is subsequently operable to "take over" responsibility from the first computer (105) and the second instance (125) running on the second computer (115) is able to access the shared disk (120).

The environment (100) of FIGS. 1A and 1B provides a guaranteed single activation of the software component—that is, it is not possible for two instances of the software component to start at the same time on different computers. If two instances of the software component were to start at the same time on different computers, this may cause errors such as corruption of data on the shared disk (120).

Although the environment (100) described above provides for high availability of a critical program and a guaranteed single activation of the critical program, special hardware (e.g. the shared disk (120) which has to be specifically configured such that it can be accessed by multiple computers) and software (e.g. the HA software) is required.

With more modern techniques, it is possible to achieve high availability and a guaranteed single activation without the requirement of special hardware and/or software.

A representation of such an environment (200) is shown in FIG. 2, wherein the environment (200) comprises two instances of the same software component. In more detail, the environment (200) comprises a third computer (205) having a third instance of a highly available software component (210) wherein the third instance (210) is operable to access a shared resource e.g. a shared disk (220) comprising data. The environment (200) also comprises a fourth computer (215) having a fourth instance of the highly available software component (225) wherein the fourth instance (225) is also operable to access the shared disk (220).

In the examples of FIGS. 1A and 1B, the software component does not have to assume responsibility for guaranteed single activation because the environment (100) comprises HA software. As the environment (200) of FIG. 2 does not comprise HA software, the software component needs to be capable of ensuring that the data on the shared disk is not corrupted by uncoordinated access from both of the computers (205, 215) at once.

If each instance of the software component consists of a single process respectively and if the data on the shared disk is contained in only a small number of files, it is sufficient to use file locking of the data files on the shared disk to ensure that data integrity is maintained.

For example, exclusive file locking can be used to ensure that only one running instance of the software component at a time is reading or writing the data files. In a more complex approach, "range-locking" of areas of the data files can be used to ensure multiple instances of the software component do not corrupt the data files by uncoordinated accesses.

Further improvements are required when a software component increases in complexity.

BRIEF SUMMARY

According to a first aspect of the preferred embodiment there is provided an apparatus for maintaining data integrity, for use in an environment comprising a first software instance having a first plurality of processes and a second software instance, wherein the first software instance and the second software instance are each operable to access shared data and wherein a file associated with the shared data is used for locking. The invention can comprise a first lock component, responsive to a first hierarchical file lock not being held by a first parent process of the first plurality of processes, for obtaining the first hierarchical file lock on behalf of the second instance; an activation component, responsive to the first hierarchical file lock being obtained on behalf of the second instance, for activating a second lock component, wherein the second lock component is operable to, responsive to a second hierarchical file lock that is a child of the first hierarchical file lock being held by none of the first plurality of processes, obtain the second hierarchical file lock on behalf of the second instance; and a prevention component, responsive to the first lock component obtaining the first hierarchical file lock and responsive to the second lock component obtaining the second hierarchical file lock, for preventing the first instance from accessing the shared data and for allowing the second instance to access the shared data.

According to a second aspect of the preferred embodiment there is provided a method for maintaining data integrity, for use in an environment comprising a first software instance having a first plurality of processes and a second software instance, wherein the first software instance and the second software instance are each operable to access shared data and wherein a file associated with the shared data is used for locking, the method comprising: obtaining, in response to a first hierarchical file lock not being held by a first parent process of the first plurality of processes, the first hierarchical file lock on behalf of the second instance; obtaining, in response to the first hierarchical file lock being obtained on behalf of the second instance and a second hierarchical file lock that is a child of the first hierarchical file lock being held by none of the first plurality of processes, second hierarchical file lock on behalf of the second instance; and in response to the first hierarchical file lock and the second hierarchical file lock being obtained, preventing the first instance from accessing the shared data and allowing the second instance to access the shared data.

According to a third aspect of the preferred embodiment there is provided a computer program comprising program code means adapted to perform all the steps of the method above when said program is run on a computer.

BRIEF DESCRIPTION OF THE SEVERAL VIEWS OF THE DRAWINGS

The present invention will now be described, by way of example only, with reference to preferred embodiments thereof, as illustrated in the following drawings.

DETAILED DESCRIPTION

In an environment wherein multiple instances of a software component each comprise multiple processes capable of accessing data of a shared resource, an improved approach is required.

In the examples herein, preferably, multiple instances of a software component are capable of being started on multiple computers concurrently. Each instance is operable to access data in the environment and each instance comprises one or more operating system processes.

Each instance of the software component is either an "active" instance (which is allowed to update data) or a "standby" instance (which is not allowed to update data).

At any point in time, the environment does not comprise more than one active instance; this ensures a single activation of a critical program. There can, however, be more than one standby instance.

A single standby instance can become a new active instance in the event of a complete failure of the active instance (i.e., a failure associated with every process of the current active instance). More preferably, a partial failure of the active instance (i.e. a failure associated with a subset of the processes of the current active instance but not with every process of the current active instance) prevents a single standby instance becoming the new active instance.

An implementation of an embodiment will now be described with reference to the figures.

Figure 1A:
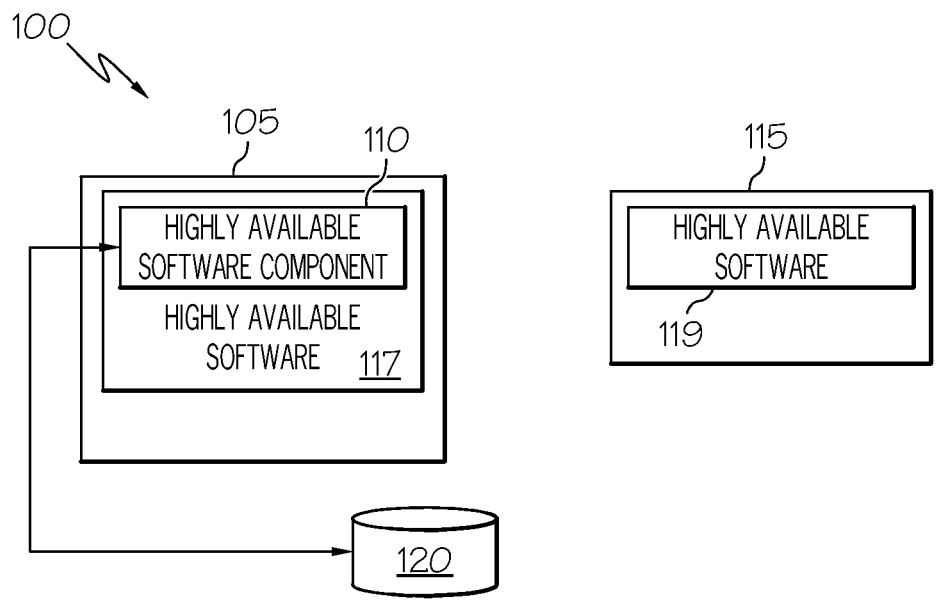
FIG. 1A is a block diagram of a prior art highly available first environment.
Figure 1B:
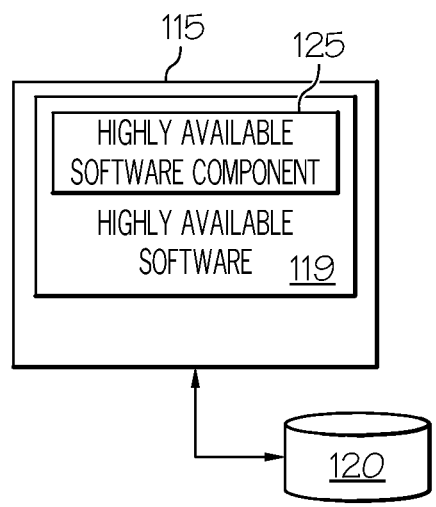
FIG. 1B is a block diagram of the prior art highly available first environment of FIG. 1, in the event of a failure of a computer in the highly available first environment.
Figure 2:
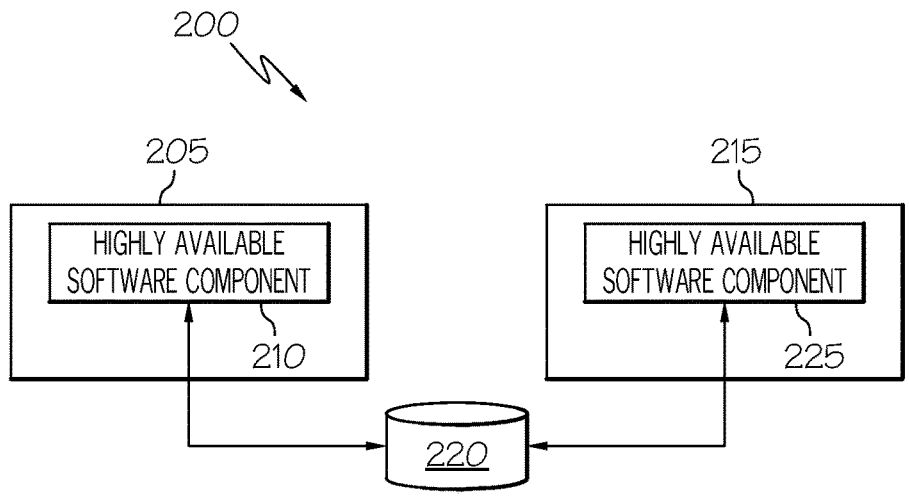
FIG. 2 is a block diagram of a prior art highly available second environment.
Figure 3:
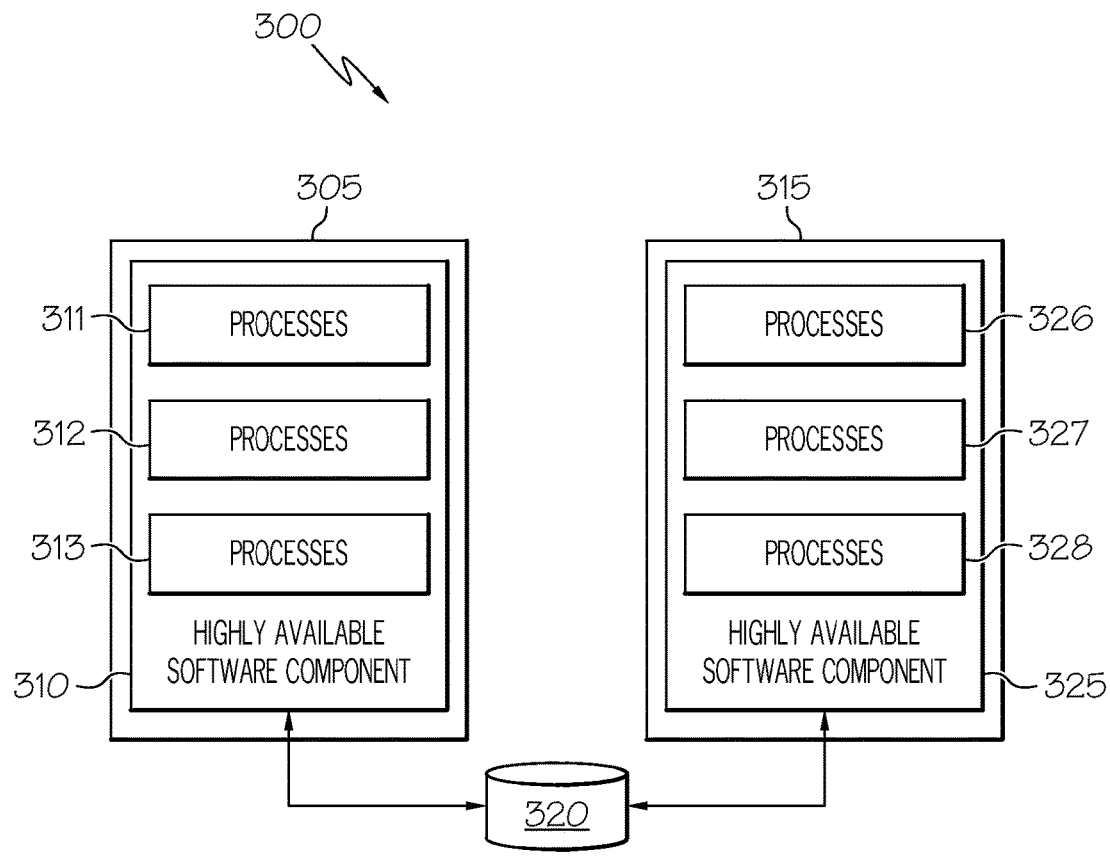
FIG. 3 is a block diagram of a highly available second environment according to the preferred embodiment.

FIG. 3 depicts a representation of a highly available environment (300) comprising a fifth computer (305) having a fifth instance of a highly available software component (310).

The fifth instance (310) comprises a plurality of processes (311, 312 and 313) each of which is operable to access a shared resource e.g. a shared disk (320) comprising data. In an example, the shared disk (320) is associated with a network file system.

A first process (311) is a parent process having two children processes (namely, a second process (312) and a third process (313)), wherein the parent process initiates the child processes.

The environment (300) also comprises a sixth computer (315) having a sixth instance of the highly available software component (325) wherein the sixth instance (325) comprises a plurality of processes (326, 327 and 328) each of which is operable to access the shared disk (320).

A fourth process (326) is a parent process having two children processes (namely, a fifth process (327) and a sixth process (328)) wherein the parent process initiates the child processes.

Figure 6A:
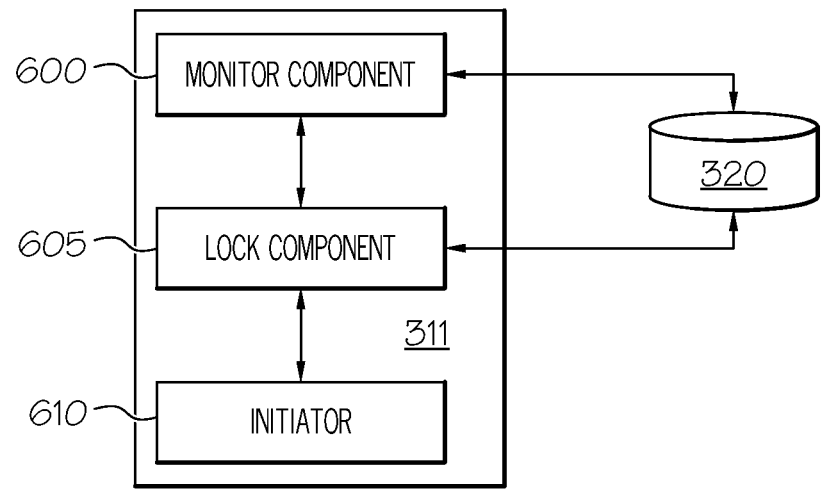
FIG. 6A is a block diagram of components associated with a first parent process.

FIG. 6A is a block diagram of components associated with the first process (311), wherein the first process (311) comprises a first monitor component (600) and a first lock component (605) each of which is operable to access the shared disk (320). The first process (311) also comprises a first initiator component (610).

Figure 6B:
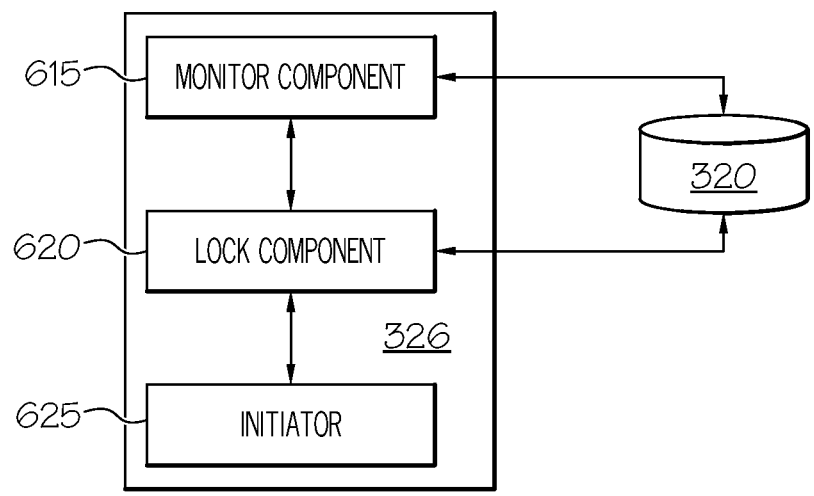
FIG. 6B is a block diagram of components associated with a second parent process.

FIG. 6B is a block diagram of components associated with the fourth process (326), wherein the fourth process (326) comprises a second monitor component (615) and a second lock component (620) each of which is operable to access the shared disk (320). The fourth process (326) also comprises a second initiator component (625).

Figure 7A:
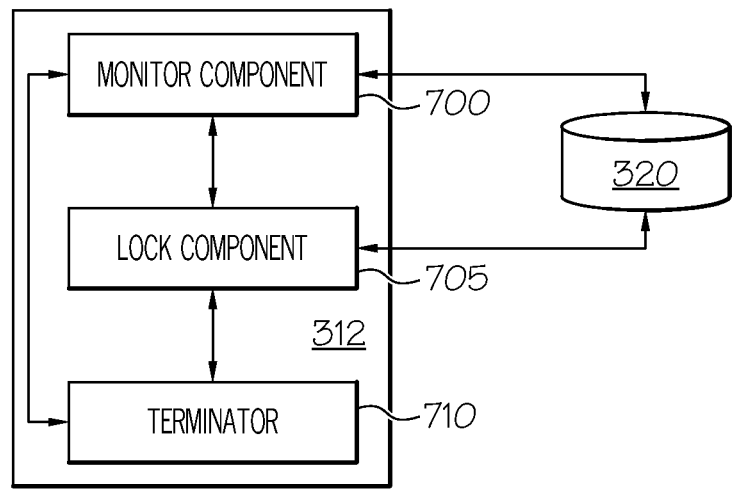
FIG. 7A is a block diagram of components associated with a first child process of the parent process of FIG. 6A.

FIG. 7A is a block diagram of components associated with the second process (312), wherein the second process (312) comprises a third monitor component (700) and a third lock component (705) each of which is operable to access the shared disk (320). The second process (312) also comprises a first terminator (710).

Figure 7B:
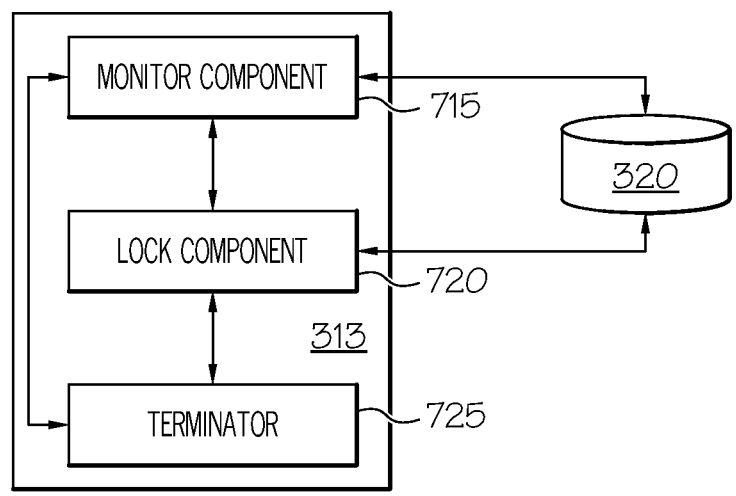
FIG. 7B is a block diagram of components associated with a second child process of the parent process of FIG. 6A.

FIG. 7B is a block diagram of components associated with the third process (313), wherein the third process (313) comprises a fourth monitor component (715) and a fourth lock component (720) each of which is operable to access the shared disk (320). The third process (313) also comprises a second terminator (725).

In one embodiment, each of a parent process and a child process is operable to access one or more locks.

Files stored on the shared disk (320) are used for locking.

In the example herein, there is provided a master lock, which can be locked in exclusive mode and an active lock which can be locked in exclusive or shared mode.

The present invention can be implemented with advisory or mandatory locks.

In an embodiment, a lock comprises an identifier associated with an instance whose parent process holds the lock. In one example, the identifier is stored in a file used for locking in the shared disk (320). In another example, the identifier is stored in a file that is separate from the file used for locking.

An example will now be described with reference to FIGS. 3 to 8.

In an example, the first process (311) begins execution, causing the fifth instance (310) to start.

Figure 4:
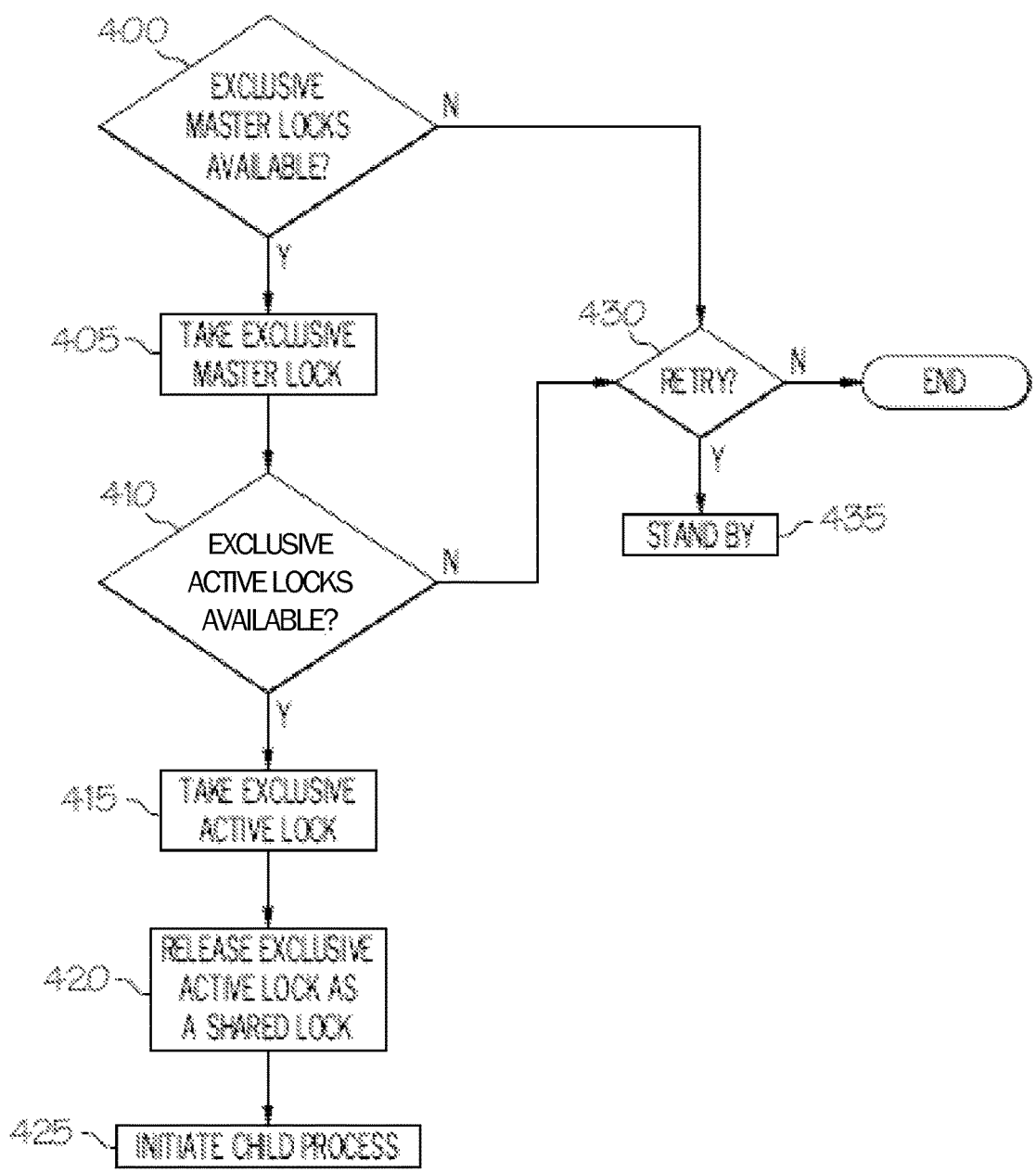
FIG. 4 is a flow chart showing the operational steps involved in a process associated with a parent process of the environment of FIG. 3.
Figure 5:
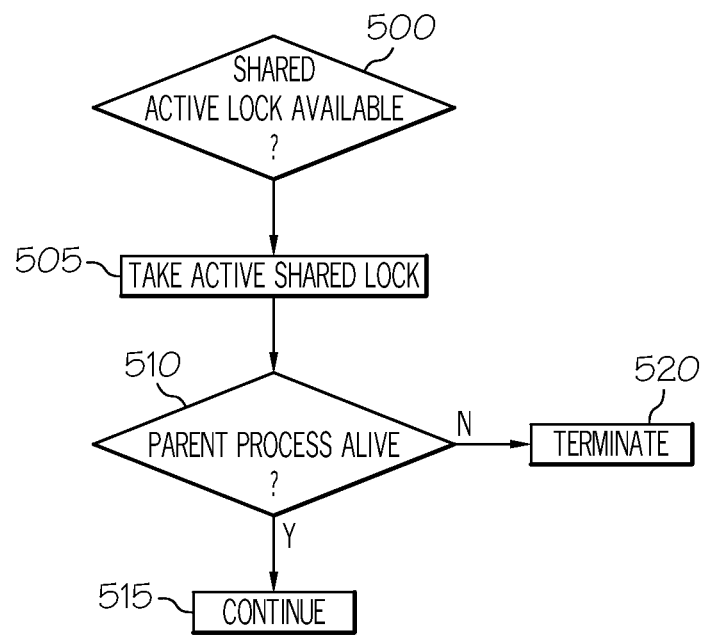
FIG. 5 is a flow chart showing the operational steps involved in a process associated with a child process of the environment of FIG. 3.

With reference to FIG. 4, the first monitor component (600) of the first process (311) monitors the master lock in order to determine (step 400) whether an exclusive mode of lock can be obtained.

The first monitor component (600) determines that an exclusive mode can be obtained on the master lock and, in response, the first lock component (605) obtains the exclusive mode on the master lock. Preferably, an identifier associated with the first process (311) is associated with the master lock.

The first monitor component (600) of the first process (311) monitors the active lock in order to determine whether an exclusive mode of lock can be obtained.

The first monitor component (600) determines that an exclusive mode can be obtained on the active lock and, in response, the first lock component (605) obtains said exclusive mode on the active lock. An identifier associated with the first process (311) can be associated with the active lock.

In response, the fifth instance (310) becomes an active instance. In this example, the fifth instance (310) becomes the only active instance.

In response, the first lock component (605) unlocks the exclusive mode on the active lock and subsequently locks the active lock in a shared mode.

The first initiator component (610) initiates one or more child processes. In the example herein, the first initiator component (610) initiates the second process (312) and the third process (313).

Alternatively, at least one of the second process (312) and the third process (313) can be initiated independently, e.g. by another process separate from the first process (311).

In an embodiment, the second process and the third process do not do any work until they have validated that the holder of the active lock is the first process—each of the third monitor component (700) and the fourth monitor component (715) checks the identifier associated with the active lock in order to determine whether the identifier is associated with the parent process of the second process and third process respectively. If the identifier is not associated with the parent process, the second process and third process assume that the parent process has failed and that they too must terminate—the termination procedure will be described in more detail below.

In the example, the identifier is associated with the parent process (namely, the first process (311)). In response, with reference to FIG. 5, upon initiation, each of the third monitor component (700) and the fourth monitor component (715) monitors the active lock in order to determine (step 500) whether a shared mode of lock can be obtained.

The third monitor component (700) determines that a shared mode can be obtained on the active lock and in response, the third lock component (705) obtains (step 505) said shared mode on the active lock.

The fourth monitor component (715) determines that a shared mode can be obtained on the active lock and in response, the fourth lock component (720) obtains (step 505) said shared mode on the active lock.

Consequently, the first process (311) holds the master lock in exclusive mode and each of the first process (311), the second process (312) and the third process (313) hold the active lock in shared mode.

As a result, another single instance cannot become the new active instance and each of the first process (311), the second process (312) and the third process (313) are safely able to access the data in the shared disk. It should be understood that as the first process (311), the second process (312) and the third process (313) are associated with the same instance (namely, the fifth instance (310)), accesses to the shared disk (320) by the first process (311), the second process (312) and the third process (313) can be coordinated using known mechanisms.

With reference to FIG. 4, in the example, the fourth process (326) is initiated by the sixth instance (325).

The fourth monitor component (615) of the fourth process (326) monitors the master lock in order to determine (400) whether an exclusive mode of lock can be obtained.

The fourth monitor component (615) determines that an exclusive mode cannot be obtained on the master lock because the exclusive mode of the master lock has already been obtained by the first process (311).

The fourth monitor component (615) can use the determination associated with whether an exclusive mode of master lock can be obtained to also determine whether another instance is active. If the fourth monitor component (615) cannot obtain the exclusive mode of master lock, the fourth monitor component (615) determines that another instance already holds the exclusive mode of master lock.

At step 430, the sixth instance (325) determines whether it will retry to become the new active instance. In response to the sixth instance (325) not retrying (step 435) to become the new active instance, the process of FIG. 4 ends.

In response to the sixth instance (325) retrying to become the new active instance, the sixth instance (325) is marked as a standby instance (step 435).

In the example, the sixth instance (325) retries (step 435) to become the new active instance and subsequently, the fourth monitor component (615) monitors the master lock in order to determine (step 400) whether an exclusive mode of lock can be obtained.

The fourth monitor component (615) determines that an exclusive mode can be obtained on the master lock because in the example, the exclusive mode of the master lock has been released by the lock component (605) of the first process (311) For example, the exclusive load can have been explicitly released because the first process (311) has finished work or implicitly released because the first process (311) has failed.

Subsequently, the fourth lock component (720) obtains (step 405) the exclusive mode on the master lock.

The sixth instance (325) now attempts to become the new active instance.

In response, the fourth monitor component (615) subsequently monitors the active lock in order to determine (step 410) whether an exclusive mode of lock can be obtained.

The first monitor component (600) determines that an exclusive mode cannot be obtained on the active lock. In the example herein, this is because at least one of the second process (312) or the third process (313) still holds the active lock in shared mode.

Subsequently, the fourth lock component (720) releases the exclusive mode on the master lock and the sixth instance (325) remains (step 430) the standby instance.

It should be understood that an embodiment provides "hierarchical" locks, namely a master lock and an active lock wherein firstly the master lock is obtained and subsequently the active lock can be obtained. By using hierarchical locks, this embodiment can provide reliability by accounting for a timing window during which the parent process of a current active instance may have terminated but an associated child process is yet to terminate—this results in the exclusive mode on the master lock being released by the parent process and the shared mode on the active lock not being released by the child process. Thus, the sixth instance (325) remains the standby instance even though the fourth process (326) is able to obtain an exclusive mode on the master lock, i.e. because the fourth process (326) is not able to obtain an exclusive mode on the active lock due to at least one of the second process (312) or the third process (313) still holding the active lock in shared mode.

In response to the sixth instance (325) not retrying (step 435) to become the new active instance, the process ends.

In the example, in response to the sixth instance (325) retrying (step 435) to become the new active instance, the fourth monitor component (615) monitors the master lock in order to determine (step 400) whether an exclusive mode of lock can be obtained.

The fourth monitor component (615) determines that an exclusive mode can be obtained on the master lock. In this example, this is because the exclusive mode of the master lock has been released by the first lock component (605) of the first process (311).

Subsequently, the fourth lock component (720) obtains the exclusive mode on the master lock.

The fourth monitor component (615) subsequently monitors the active lock in order to determine (step 410) whether an exclusive mode of lock can be obtained.

The first monitor component (600) determines that an exclusive mode can be obtained on the active lock. In the example herein, this is because neither the second process (312) nor the third process (313) still holds the active lock in shared mode.

The event in which neither the second process (312) nor the third process (313) still holds the active lock in shared mode can be caused by each of the second process and third process being explicitly or implicitly terminated. That even can also be caused by the first process (311) terminating (either explicitly or implicitly by failure) and subsequently, each of the third monitor component (700) and the fourth monitor component (715) determining that the first process (311) has terminated by using a polling function (step 510). Subsequently, each of the first terminator (710) and the second terminator (725) of the second process and the third process respectively terminates (step 520) and releases the active lock in shared mode. It should be understood that if the first process (311) has not terminated, a child process can continue to work (step 515).

In response to the first monitor component (600) determining that an exclusive mode can be obtained on the active lock, the fourth lock component (720) obtains the exclusive mode on the active lock.

In response, the sixth instance (325) becomes the new active instance.

It should be understood that in the example above, as there are no child processes of the fifth instance (310) (namely, the previous active instance) running, the fourth lock component (720) is operable to obtain the exclusive mode on the active lock. Furthermore, as each of the processes (311, 312 and 313) associated with the fifth instance (310) are not running, the fourth lock component (720) is operable to obtain exclusive mode on each of the master lock and the active lock.

In another implementation, a plurality of active locks is provided. Preferably, if an exclusive mode on a master lock has been released, all processes of an active instance must release all of the plurality of active locks in order for another instance to be able to try to become the new active instance.

Subsequently, the fourth lock component (720) unlocks the exclusive mode on the active lock and subsequently locks the active lock in a shared mode.

The second initiator component (625) can initiate one or more child processes e.g. the fifth process (327) and the sixth process (328).

Aspects of the present invention may take the form of a computer program product embodied in one or more computer readable storage medium(s) having computer readable program code embodied thereon. In the context of this document, a computer readable storage medium may be any tangible medium that can contain, or store a program for use by or in connection with an instruction execution system, apparatus, or device.

Embodiments of the present invention can allow for high availability in which for example an instance can become a new active instance and allow for guaranteed single activation of an instance such that only one instance of the software component can access shared data at a time in an environment wherein each instance can comprise multiple processes. For example, guaranteed single activation can be provided by using "hierarchical" locking with an exclusive master lock and an exclusive/shared active lock.

In embodiments of the present invention, there is no need for an instance to be configured with the location of another instance and there is no need for network heartbeating between instances to ensure single activation. This is because single activation can be guaranteed using file locking. A standby instance can replace a failed instance without needing to know data associated with the failed instance, e.g. a location associated with where the failed instance was running.

HA software is not required in embodiments of the present invention. This increases usability and allows standby instances to be introduced more easily.

Furthermore, the association with a lock of an identifier of the process which holds the lock can be advantageous if, for example, there has been a network outage. Following the outage, a parent process can re-obtain the lock and query the identifier to determine whether the identifier is its own. If the identifier is its own, the process knows that it held the lock before the outage and that no other instance obtained the lock during the outage. If the identifier is not its own, the process knows that another instance must have obtained the lock during the outage—in this case, the parent process and other processes associated with the instance must terminate to guarantee integrity and, if required, the parent process can re-execute and try to obtain the lock.

It should be understood that if there are a plurality of standby instances, when a current active instance is no longer the active instance, a selection process is implemented in order to select a single standby instance to become the new active instance. Examples include where the plurality of standby instances "race" to become the new active instance and where the plurality of standby instances decide which of them is to become the new active instance. Alternatively, a further lock file can be used to co-ordinate and monitor standby instances.

I claim:

1. A computer-implemented method for maintaining data integrity of a shared resource accessible by a first instance of a software component and a second instance of the software component, comprising:
    determining, by a first monitoring process of the first instance executing on a first computer, that an exclusive mode of a master lock for the shared resource is obtainable;
    determining, by the first monitoring process and after the exclusive mode of the master lock has been obtained by the first instance, that an exclusive mode of an active lock for the shared resource is obtainable; and
    designating, after the exclusive mode of the active lock has been obtained by the first instance, the first process as an active instance and the second instance as a standby instance, wherein
    the second instance executes on a second computer, and
    the active lock, configurable between a shared mode and the exclusive mode, and the master lock are stored in the shared resource.

2. The method of claim 1, further comprising:
    unlocking, after the first instance is the active instance and by the first instance, the exclusive mode of the active lock; and
    locking, after the unlocking, the active lock in the shared mode.

3. The method of claim 1, further comprising:
    validating, by a first child process of the first instance, that a first parent process of the first instance is a holder of the active lock.

4. The method of claim 3, further comprising:
    determining, by the first child process, that the shared mode of the active lock is obtainable, and
    obtaining, by the first child process, the shared mode of the active lock, wherein
    the first parent process is the holder of the master lock in the exclusive mode while the first child process is a holder of the active lock in the shared mode.

5. The method of claim 4, wherein
    another child process of the first parent process is a holder of the active in the shared mode while the first child process is a holder of the active lock in the shared mode.

6. The method of claim 1, further comprising:
    determining, by a second monitoring process of the second instance, that the exclusive mode of the master lock is obtainable;
    determining, by the second monitoring process and after the exclusive mode of the master lock has been obtained by the second instance, that the exclusive mode of the active lock is not obtainable; and
    releasing, by the second monitoring process and based upon the exclusive mode of the active lock not being obtainable, the exclusive mode of the master lock.

7. A computer hardware system configured to maintaining data integrity of a shared resource accessible by a first instance of a software component and a second instance of the software component, comprising
    a computer configured to perform:
        determining, by a first monitoring process of the first instance executing on a first computer, that an exclusive mode of a master lock for the shared resource is obtainable;
        determining, by the first monitoring process and after the exclusive mode of the master lock has been obtained by the first instance, that an exclusive mode of an active lock for the shared resource is obtainable; and
        designating, after the exclusive mode of the active lock has been obtained by the first instance, the first process as an active instance and the second instance as a standby instance, wherein
    the second instance executes on a second computer, and
    the active lock, configurable between a shared mode and the exclusive mode, and the master lock are stored in the shared resource.

8. The system of claim 7, wherein the computer is further configured to perform:
    unlocking, after the first instance is the active instance and by the first instance, the exclusive mode of the active lock; and
    locking, after the unlocking, the active lock in the shared mode.

9. The system of claim 7, wherein the computer is further configured to perform:
    validating, by a first child process of the first instance, that a first parent process of the first instance is a holder of the active lock.

10. The system of claim 9, wherein the computer is further configured to perform:
    determining, by the first child process, that the shared mode of the active lock is obtainable, and
    obtaining, by the first child process, the shared mode of the active lock, wherein
    the first parent process is the holder of the master lock in the exclusive mode while the first child process is a holder of the active lock in the shared mode.

11. The system of claim 10, wherein
    another child process of the first parent process is a holder of the active in the shared mode while the first child process is a holder of the active lock in the shared mode.

12. The system of claim 7, wherein the computer is further configured to perform:
    determining, by a second monitoring process of the second instance, that the exclusive mode of the master lock is obtainable;
    determining, by the second monitoring process and after the exclusive mode of the master lock has been obtained by the second instance, that the exclusive mode of the active lock is not obtainable; and
    releasing, by the second monitoring process and based upon the exclusive mode of the active lock not being obtainable, the exclusive mode of the master lock.

13. A computer program product, comprising:
    a computer readable hardware storage device having stored therein computer readable program code for maintaining data integrity of a shared resource accessible by a first instance of a software component and a second instance of the software component,
    the computer readable program code, which when executed by a computer hardware system, causes the computer hardware system to perform:

determining, by a first monitoring process of the first instance executing on a first computer, that an exclusive mode of a master lock for the shared resource is obtainable;

determining, by the first monitoring process and after the exclusive mode of the master lock has been obtained by the first instance, that an exclusive mode of an active lock for the shared resource is obtainable; and designating, after the exclusive mode of the active lock has been obtained by the first instance, the first process as an active instance and the second process as a standby instance, wherein the second instance executes on a second computer, and the active lock, configurable between a shared mode and the exclusive mode, and the master lock are stored in the shared resource.

14. The computer program product of claim 13, wherein the computer readable program code further causes the computer hardware system to perform:

unlocking, after the first instance is the active instance and by the first instance, the exclusive mode of the active lock; and locking, after the unlocking, the active lock in the shared mode.

15. The computer program product of claim 13, wherein the computer readable program code further causes the computer hardware system to perform:

validating, by a first child process of the first instance, that a first parent process of the first instance is a holder of the active lock.

16. The computer program product of claim 15, wherein the computer readable program code further causes the computer hardware system to perform:

determining, by the first child process, that the shared mode of the active lock is obtainable, and obtaining, by the first child process, the shared mode of the active lock, wherein the first parent process is the holder of the master lock in the exclusive mode while the first child process is a holder of the active lock in the shared mode.

17. The computer program product of claim 16, wherein another child process of the first parent process is a holder of the active in the shared mode while the first child process is a holder of the active lock in the shared mode.

18. The computer program product of claim 13, wherein the computer readable program code further causes the computer hardware system to perform:

determining, by a second monitoring process of the second instance, that the exclusive mode of the master lock is obtainable;

determining, by the second monitoring process and after the exclusive mode of the master lock has been obtained by the second instance, that the exclusive mode of the active lock is not obtainable; and releasing, by the second monitoring process and based upon the exclusive mode of the active lock not being obtainable, the exclusive mode of the master lock.

* * * * *